United States Patent
Moon

(10) Patent No.: US 6,173,352 B1
(45) Date of Patent: *Jan. 9, 2001

(54) MOBILE COMPUTER MOUNTED APPARATUS FOR CONTROLLING ENABLEMENT AND INDICATING OPERATIONAL STATUS OF A WIRELESS COMMUNICATION DEVICE ASSOCIATED WITH THE MOBILE COMPUTER

(75) Inventor: Billy Gayle Moon, Apex, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/915,966

(22) Filed: Aug. 21, 1997

(51) Int. Cl.[7] .................................................. G06F 13/60
(52) U.S. Cl. .............................. 710/129; 710/62; 710/63
(58) Field of Search ............................ 340/825.44, 311.1; 375/222; 379/58; 455/38.2, 557, 575, 90; 710/62, 63, 64, 129, 72

(56) References Cited

U.S. PATENT DOCUMENTS

| | | |
|---|---|---|
| 4,665,519 | 5/1987 | Kirchner et al. . |
| 4,972,457 | 11/1990 | O'Sullivan . |
| 5,043,721 * | 8/1991 | May ................................ 340/825.44 |
| 5,302,947 * | 4/1994 | Fuller et al. ..................... 340/825.34 |
| 5,355,507 * | 10/1994 | Nishikawa ....................... 395/800.01 |
| 5,375,051 | 12/1994 | Decker et al. . |
| 5,387,904 * | 2/1995 | Takada ............................. 340/825.44 |
| 5,546,590 | 8/1996 | Pierce . |
| 5,550,861 * | 8/1996 | Chan et al. ........................... 375/222 |
| 5,566,340 | 10/1996 | Stewart et al. . |
| 5,611,055 * | 3/1997 | Krishan et al. ...................... 395/281 |
| 5,737,707 * | 4/1998 | Gaulke et al. ....................... 455/556 |

FOREIGN PATENT DOCUMENTS

WO 90/03076  3/1990  (WO) .

OTHER PUBLICATIONS

PCT International Search Report, Jan. 27, 1999, PCT/US 98/17174.

EPO Standard Search Report No. RS 100287 US, dated Apr. 8, 1998.

* cited by examiner

Primary Examiner—Ayaz R. Sheikh
Assistant Examiner—Raymond N Phan
(74) Attorney, Agent, or Firm—Jenkens & Gilchrist, P.C.

(57) ABSTRACT

A switch positioned on an exterior housing of a mobile computer has a first position associated with enablement of a wireless communication device incorporated within the mobile computer. When in the first position, the switch provides indication that the wireless communication device is enabled. The switch also has a second position associated with disablement of the wireless communication device. When in the second position, the switch provides indication that the wireless communication device is disabled. The switch having no affect on the enablement or disablement of the mobile computer. Also included is a means for enabling the wireless communication device when the switch is in the first position and disabling the wireless communication device when the switch is in the second position. Furthermore, light emitting diodes provide indication of the status of the wireless communication device within the mobile computer.

8 Claims, 1 Drawing Sheet

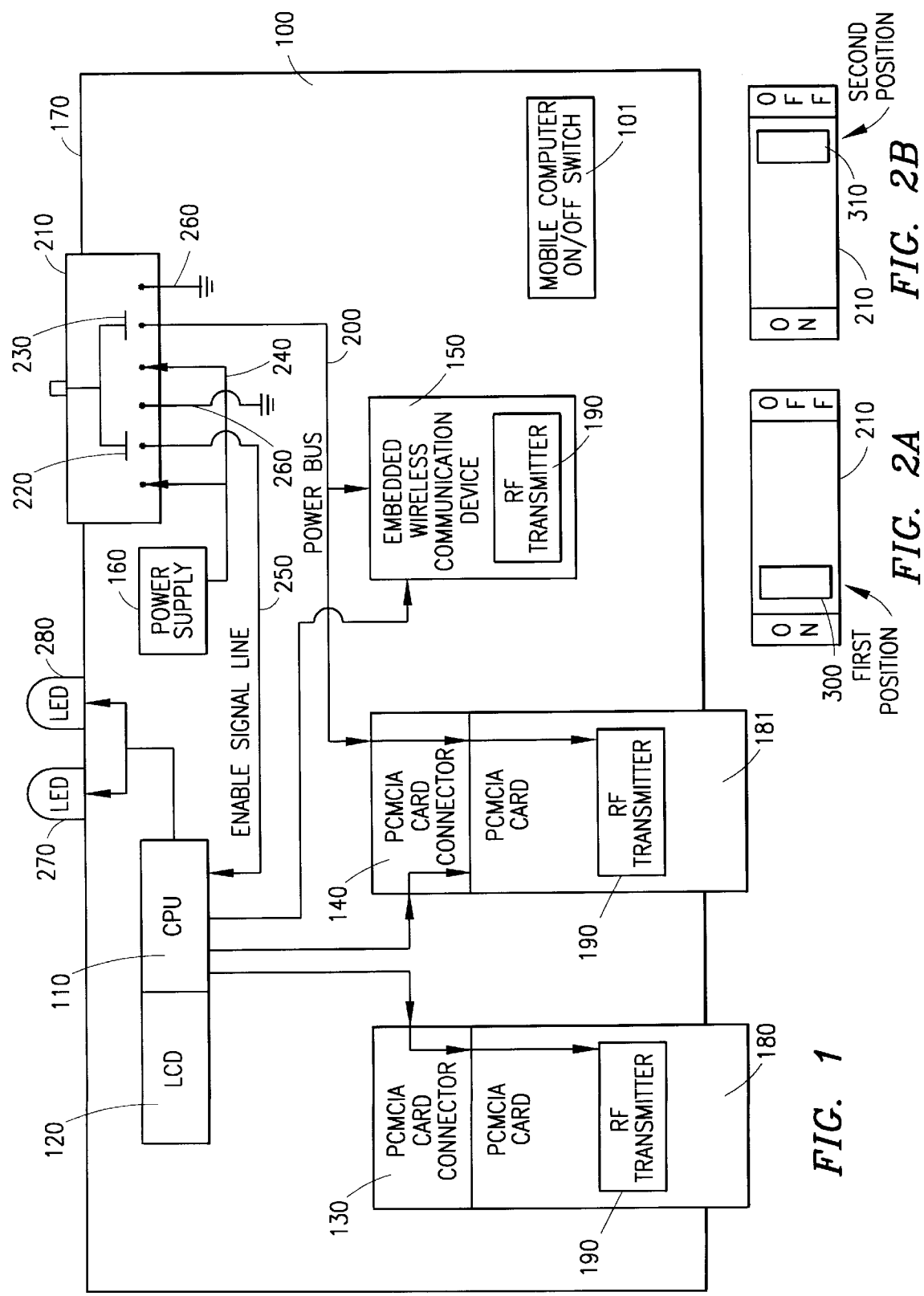

MOBILE COMPUTER MOUNTED APPARATUS FOR CONTROLLING ENABLEMENT AND INDICATING OPERATIONAL STATUS OF A WIRELESS COMMUNICATION DEVICE ASSOCIATED WITH THE MOBILE COMPUTER

BACKGROUND OF THE INVENTION

1. Technical Field of the Invention

The present invention pertains in general to power control for mobile personal computers and wireless communication devices, and more particularly, to an apparatus for disabling and enabling wireless communication devices incorporated within a mobile personal computer and providing a visual verification thereof.

2. Description of Related Art

In the past several years there has been a dramatic increase in the use of both mobile personal computers and wireless communication devices. These trends are likely to continue into the foreseeable future as such wireless communication devices become embedded within the mobile personal computers either through the use of Personal Computer Memory Card Interface Adapter (PCMCIA) cards or through the addition of hardware mounted to a mother board of the computer.

Although mobile personal computers are frequently used onboard aircraft, their use is not allowed at certain times such as during takeoffs or landings. On the other hand, unlike mobile personal computers, United States Federal Aviation Administration regulations forbid the use or activation of wireless communication devices at any time while onboard the aircraft. The absolute ban applies to all wireless communication devices such as cellular phones, two-way pagers, and wireless local area network adapters installed in the mobile personal computer, among others. There exists a need for a mechanism to easily power off wireless communication devices within mobile personal computers and to be able to clearly verify to airline personnel that such wireless communication devices are disabled.

Currently, there is no convenient solution to address these two needs. Users of mobile text modems and two-way pagers, which are typically constructed on type II PCMCIA or type III PCMCIA cards, may be instructed to remove the PCMCIA device while onboard an aircraft. Other devices which are embedded within the hardware of the mobile personal computer require the user to power-up the mobile personal computer and enter a menu to deactivate the wireless communication device. These wireless communication devices, however, momentarily activate when the mobile personal computer is powered-up. Therefore, any user who activates the mobile personal computer equipped with such a wireless communication device while onboard an aircraft is in violation of federal law. Furthermore, there is no method for verifying to airline personnel that the wireless communication device is deactivated.

It would be advantageous, therefore, to devise a method and apparatus for easily disabling a wireless communication device incorporated into a mobile personal computer. It would further be advantageous if such a method and apparatus provided a clear indication when the wireless communication device is disabled.

SUMMARY OF THE INVENTION

The present invention comprises a switch positioned on an exterior housing of a mobile computer, the switch having a first position associated with enablement of a wireless communication device incorporated within the mobile computer and further being indicative of an enabled status. The switch also having a second position associated with disablement of the wireless communication device and being indicative of a disabled status. While the switch enables and disables the wireless communication device, the switch does not affect the enablement or disablement of the mobile computer. The present invention further includes a means for enabling the wireless communication device when the switch is in the first position and disabling the wireless communication device when the switch is in the second position. The present invention also includes light emitting diodes for indicating the enabled/disabled status of the wireless communication device within the mobile computer.

BRIEF DESCRIPTION OF THE DRAWINGS

For a more complete understanding of the present invention, reference is made to the following detailed description taken in conjunction with the accompanying drawings wherein:

FIG. 1 is a functional block diagram of a preferred embodiment of the present invention;

FIG. 2A is an exterior view of a switch in a first position indicative of an enabled status for a wireless communication device within a mobile computer; and FIG. 2B is an exterior view of a switch in a second position indicative of a disabled status for a wireless communication device within a mobile computer.

DETAILED DESCRIPTION OF THE INVENTION

Referring now to FIG. 1, there is illustrated a functional block diagram of a preferred embodiment of the present invention. A mobile personal computer 100 includes a Central Processing Unit (CPU) 110, a Liquid Crystal Display (LCD) 120, a first Personal Computer Memory Card Interface Adapter (PCMCIA) power and interface connector 130, a second PCMCIA power and interface connector 140, a wireless communication device 150 embedded within the mobile computer 100, and a power supply 160 all positioned within an exterior housing 170 of the mobile computer 100. The mobile computer 100 further having an on/off switch 101 for enabling and disabling the mobile computer 100.

PCMCIA cards 180 and 181 are inserted into the mobile computer through the exterior housing 170 of the mobile computer 100 and receive power from, and communicate with the mobile computer 100 through, the PCMCIA power and interface connectors 130 and 140, respectively. Power to the PCMCIA cards 180 and 181 received via the PCMCIA power and interface connectors 130 and 140, respectively, is controlled by the CPU 110. Additionally, PCMCIA power and interface connector 140 and the embedded wireless communication device 150 further receive power to operate radio frequency transmitters 190 located within the embedded wireless communication device 150 and PCMCIA card 181 respectively via a radio frequency power bus 200.

A double-pole double-throw switch 210 extends through the exterior housing 170. The switch has a first pole 220 and a second pole 230. When the switch 210 is in a first position, the first pole 220 electrically connects the output 240 of the power supply 160 to an enable signal line 250. The enable signal line is an input to the CPU 110 which, when connected to the output of the power supply 240, causes the CPU 110 to enable power to the PCMCIA cards 180 and 181 via the power and interface connectors 130 and 140 respectively. Furthermore, when the switch 210 is in the first position, the second pole 230 electrically connects the output 240 of the power supply 160 to the power bus 200 thereby providing power to transmitters 190 located in the PCMCIA card 181 and embedded wireless communication device 150.

When the switch 210 is in a second position, the first pole 220 electrically connects the enable signal line 250 to ground 260. Connecting the enable signal line 250 to ground 260 causes the CPU 110 to disable power to the PCMCIA cards 180 and 181 via the power and interface connectors 130 and 140, respectively. Furthermore, when the switch 210 is in the second position, the second pole 230 electrically connects the power bus 200 to ground 260 thereby removing power to transmitters 190 located in the PCMCIA card 181 and embedded wireless communication device 150.

Although the switch 210 is described as being a double pole double throw switch, any switch combination can be used to connect the enable signal line 250 and/or the power bus 200 alternatively to the output 240 of the power supply 160 or ground 260.

The mobile computer 100 further includes a plurality of light emitting diode pairs (only one shown) with each pair consisting of a red light emitting diodes (LED) 270 and a green light emitting diode 280 (LED). Each pair of LEDs is associated with one of the radio frequency transmitters 190. When the transmitters 190 are receiving power but are on stand-by, and therefore not transmitting, the associated green LEDs 280 are illuminated in a blinking fashion. When the transmitters 190 are transmitting, the associated red LEDs 270 are continuously illuminated. When the transmitters on standby and connected to a charger the associated green LEDs 280 are continuously illuminated.

Referring additionally now to FIG. 2A there is illustrated an exterior view of the switch 210 in the first position 300 indicative of the transmitters 190 having an enabled status. The switch 210 having no affect on the enablement or disablement of the mobile computer 100. As an example of an indication that the switch 210 is in an enabled status, the switch points to text printed on the switch 210 stating, "wireless communication mode."

Referring additionally now to FIG. 2B there is illustrated an exterior view of the switch 210 in the second position 310 indicative of the transmitters 190 having a disabled status. As an example of an indication that the switch 210 is in an disabled status, the switch points to text printed on the switch 210 stating, "airplane mode."

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for enabling and disabling a wireless communication device, the wireless communication device internally located within a mobile computer comprising:

a switch extending through and mounted directly to an exterior housing of the computer, the switch having no affect on enablement or disablement of the mobile computer, the switch having a first position associated with enablement of the wireless communication device and being indicative of a wireless communication device enabled status, the switch having a second position associated with disablement of the wireless communication device internally located within the mobile computer and being indicative of a wireless communication device disabled status; and circuitry for enabling the wireless communication device when the switch is in the first position and disabling the wireless communication device when the switch is in the second position.

2. The apparatus recited in claim 1, wherein the circuitry for enabling the wireless communication device when the switch is in the first position and disabling the wireless communication device when the switch is in the second position electrically connects a radio frequency power bus of the wireless communication device to supply power when the switch is in the first position and electrically connects the radio frequency power bus of the wireless communication device to ground when the switch is in the second position.

3. The apparatus recited in claim 1, further including a circuitry for enabling a PCMCIA wireless communication card when the switch is in the first position and disabling the PCMCIA wireless communication card when the switch is in the second position.

4. The apparatus recited in claim 3, wherein the circuitry for enabling the wireless communication device when the switch is in the first position and disabling the wireless communication device when the switch is in the second position electrically connects an enable signal line of a central processing unit of the mobile computer to supply power when the switch is in the first position, the central processing unit connecting supply power to the PCMCIA card in response thereto, and electrically connects the enable signal line of the central processing unit of the mobile computer to ground when the switch is in the second position, the central processing unit disconnecting supply power to the PCMCIA card in response thereto.

5. The apparatus recited in claim 1, wherein the disabled position of the switch is identified as airplane mode, and further wherein the enabled position of the switch is identified as wireless communication mode.

6. An apparatus for indicating the status of a wireless communication device incorporated internally within into a mobile computer comprising:

a switch directly mounted to an external housing of the mobile computer, the switch having no affect on enablement or disablement of the mobile computer, the switch having a disabled position wherein the wireless communication device is disabled, the switch further having an enabled position wherein the wireless communication device is enabled; and a visual indicator for identifying whether the wireless communication device is enabled or disabled.

7. The apparatus recited in claim 6, wherein the visual indicator comprises:

a first light emitting diode mounted on the external housing of the mobile computer, the first light emitting diode emitting a first color of light when the wireless communication device is transmitting; and a second light emitting diode mounted on the external housing of the mobile computer, the second light emitting diode emitting a second color of light when the wireless communication device is in stand-by mode.

8. The apparatus recited in claim 6, wherein the visual indicator comprises:

a red light emitting diode mounted on the external housing of the mobile computer, the red light emitting diode emitting red light when the wireless communication device is transmitting; and a green light emitting diode mounted on the external housing of the mobile computer, the green light emitting diode emitting a green light when the wireless communication device is in stand-by mode.

* * * * *